United States Patent
Kobayashi et al.

(10) Patent No.: US 12,106,331 B2
(45) Date of Patent: Oct. 1, 2024

(54) ADVERTISEMENT DISTRIBUTION SYSTEM

(71) Applicant: Glory Ltd., Himeji (JP)

(72) Inventors: Kiyoaki Kobayashi, Himeji (JP); Tetsuya Tameike, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/116,327

(22) Filed: Mar. 2, 2023

(65) Prior Publication Data

US 2023/0281672 A1 Sep. 7, 2023

(30) Foreign Application Priority Data

Mar. 7, 2022 (JP) .................................. 2022-034215

(51) Int. Cl.
*G06Q 30/00* (2023.01)
*G06Q 30/0251* (2023.01)
*G06Q 30/0273* (2023.01)

(52) U.S. Cl.
CPC ..... *G06Q 30/0275* (2013.01); *G06Q 30/0268* (2013.01)

(58) Field of Classification Search
CPC .................. G06Q 30/0275; G06Q 30/0268
See application file for complete search history.

(56) References Cited

U.S. PATENT DOCUMENTS

| 7,739,144 B2 | 6/2010 | Coutts et al. |
| 10,891,660 B1 * | 1/2021 | Catoe ................. G06Q 30/0268 |
| 2002/0138433 A1 | 9/2002 | Black et al. |
| 2005/0078177 A1 * | 4/2005 | Gotanda .................... G07F 9/02 725/43 |
| 2006/0041475 A1 * | 2/2006 | Sullivan ............. G06Q 30/0277 705/14.69 |
| 2008/0154708 A1 | 6/2008 | Allan et al. |
| 2010/0050201 A1 | 2/2010 | Kubota et al. |
| 2015/0073899 A1 | 3/2015 | Carpenter et al. |

FOREIGN PATENT DOCUMENTS

| JP | 2000-250447 A | 9/2000 |
| JP | 2009-301458 A | 12/2009 |

OTHER PUBLICATIONS

Extended European Search Report issued Jun. 30, 2023 in European Patent Application No. 23159507.5.

* cited by examiner

*Primary Examiner* — Meredith A Long
(74) *Attorney, Agent, or Firm* — XSENSUS LLP

(57) ABSTRACT

An advertisement distribution system for distributing an advertisement to at least one terminal apparatus installed in the store, includes: a management server configured to manage a plurality of advertisements; and a store server configured to select, based on a distribution condition set for each of the plurality of advertisements, an advertisement to be distributed and a terminal apparatus to be a distribution destination of the advertisement, and distribute the advertisement to the terminal apparatus. The terminal apparatus displays the advertisement distributed from the store server, and outputs information on a display record, which is a record of actual display on the terminal apparatus, of the advertisement. The management server manages, based on the information outputted from the terminal apparatus, the display record of each of advertisements that have been actually displayed in the store.

10 Claims, 8 Drawing Sheets

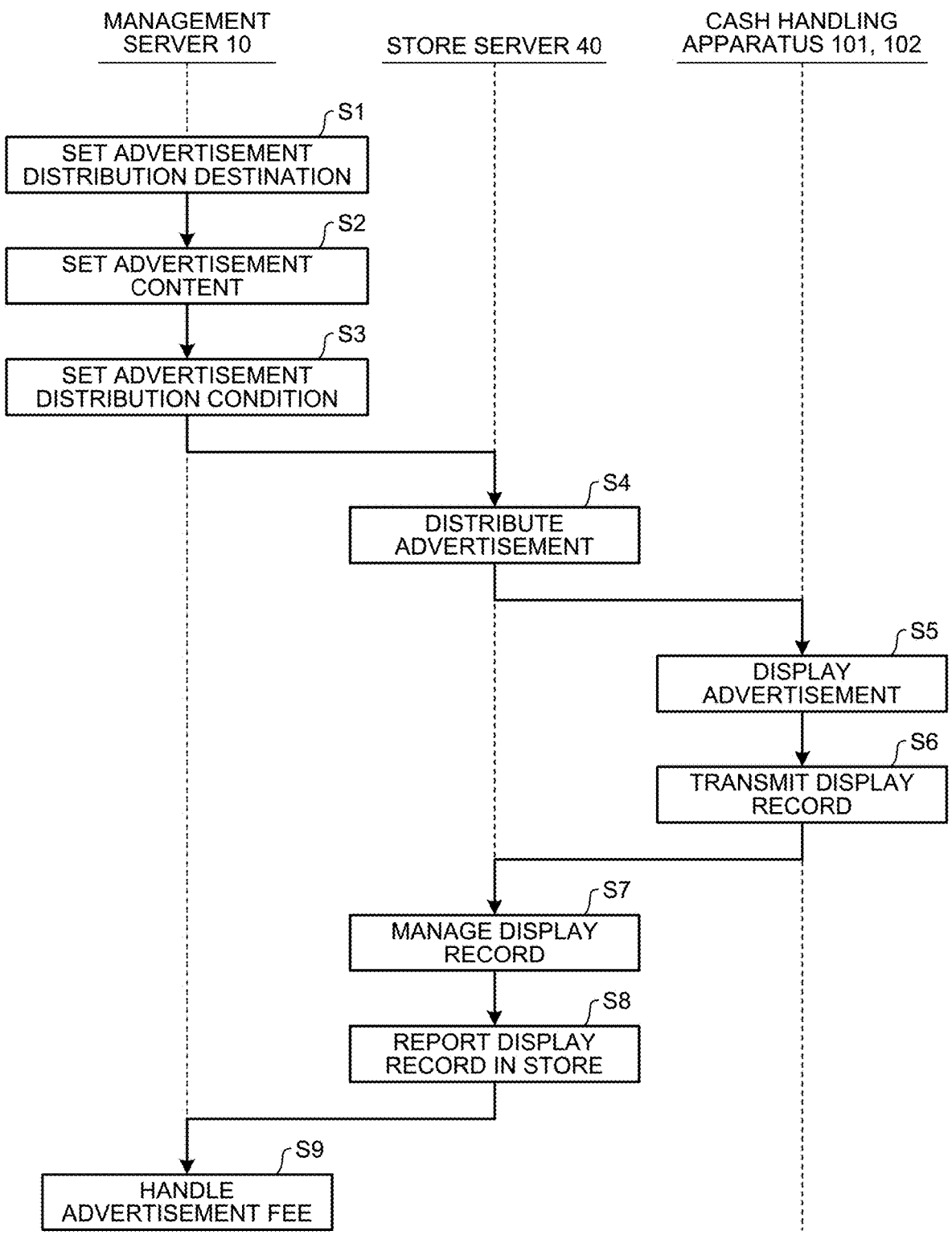

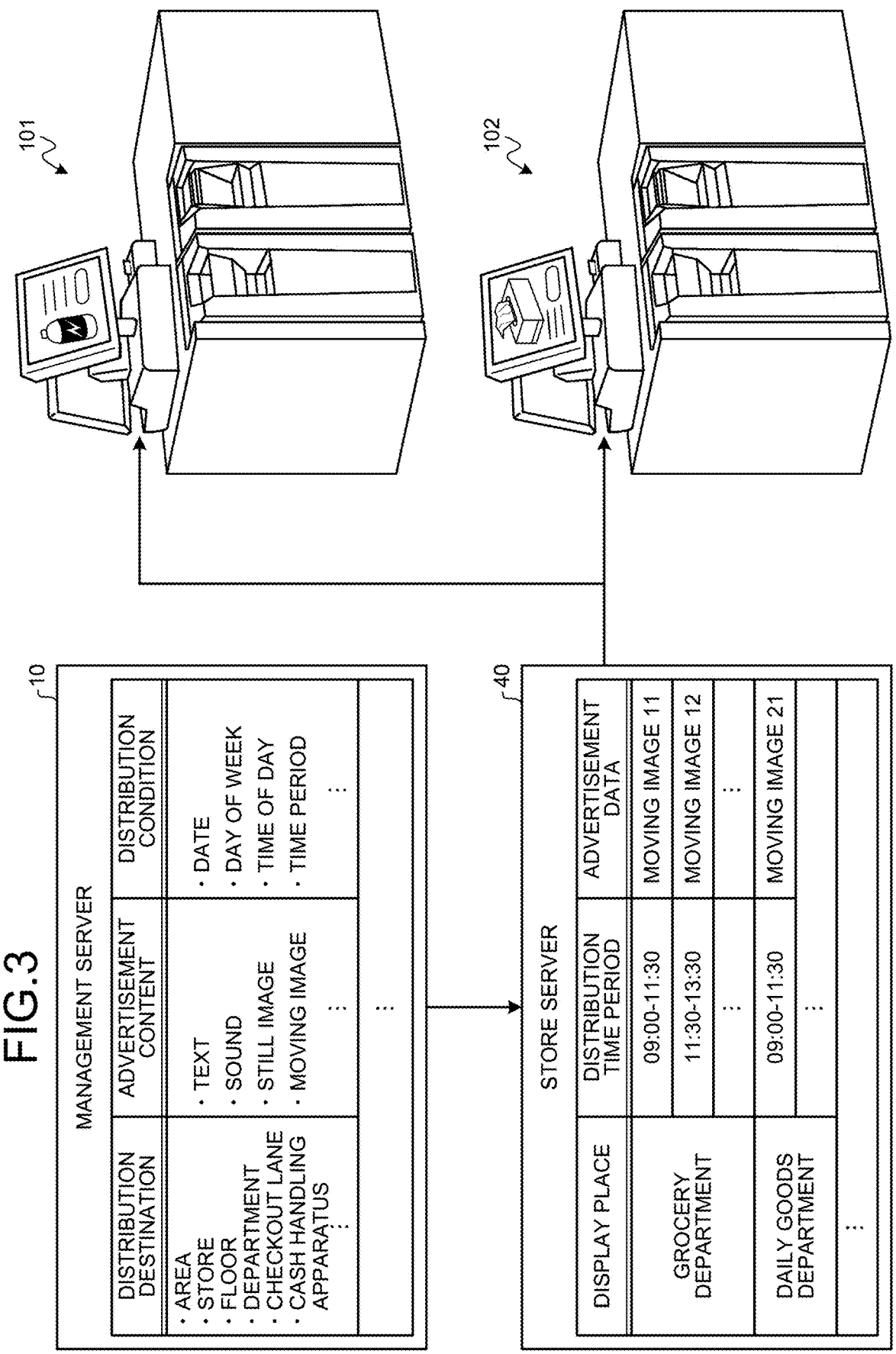

PLEASE INSERT CASH

PAYMENT AMOUNT ···JPY
DEPOSITED AMOUNT ···JPY
CHANGE ···JPY

NEW PRODUCT!

···JPY

FOR NOW ONLY:
WITH FREE GIFT

PLEASE INSERT CASH

PAYMENT AMOUNT
···JPY
DEPOSITED AMOUNT
···JPY
CHANGE
···JPY

NEW PRODUCT!

···JPY

FOR NOW ONLY:
WITH FREE GIFT

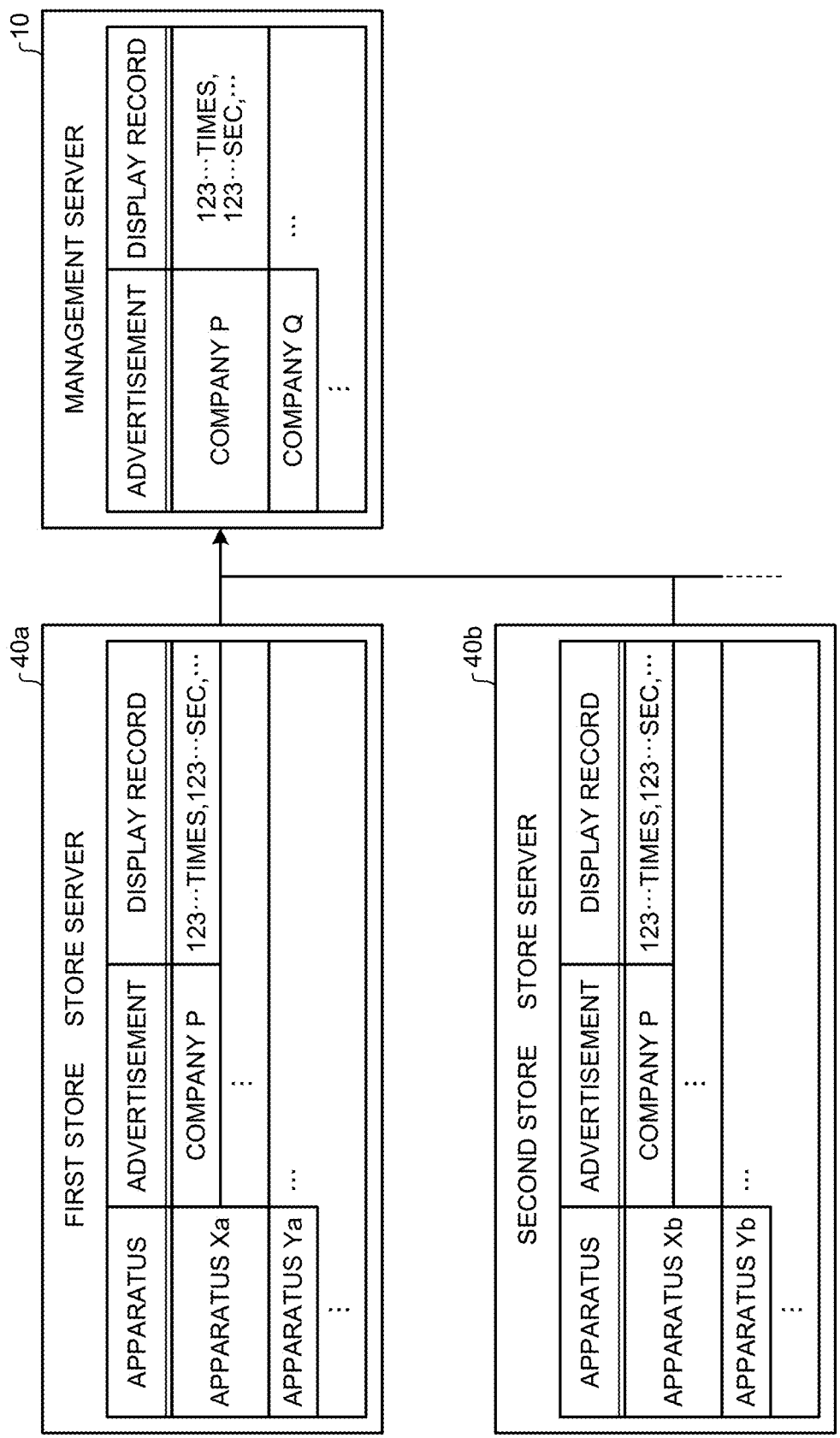

FIG.6

| COMPANY | | | STORE | | | ADVERTISEMENT | | | APPARATUS | | |
|---|---|---|---|---|---|---|---|---|---|---|---|
| | DISPLAY RECORD | ADVERTISEMENT FEE | | DISPLAY RECORD | ADVERTISEMENT FEE | | DISPLAY RECORD | ADVERTISEMENT FEE | | DISPLAY RECORD | ADVERTISEMENT FEE |
| COMPANY A | 123···TIMES 123···SEC ⋮ | 123···JPY | FIRST STORE | 123···TIMES 123···SEC ⋮ | 123···JPY | COMPANY P | 123···TIMES 123···SEC ⋮ | 123···JPY | APPARATUS Xa | 123···TIMES 123···SEC ⋮ | 123···JPY |
| | | | SECOND STORE | ⋮ | | COMPANY Q | ⋮ | | APPARATUS Ya | ⋮ | |
| COMPANY B | ⋮ | | | | | | | | | | |

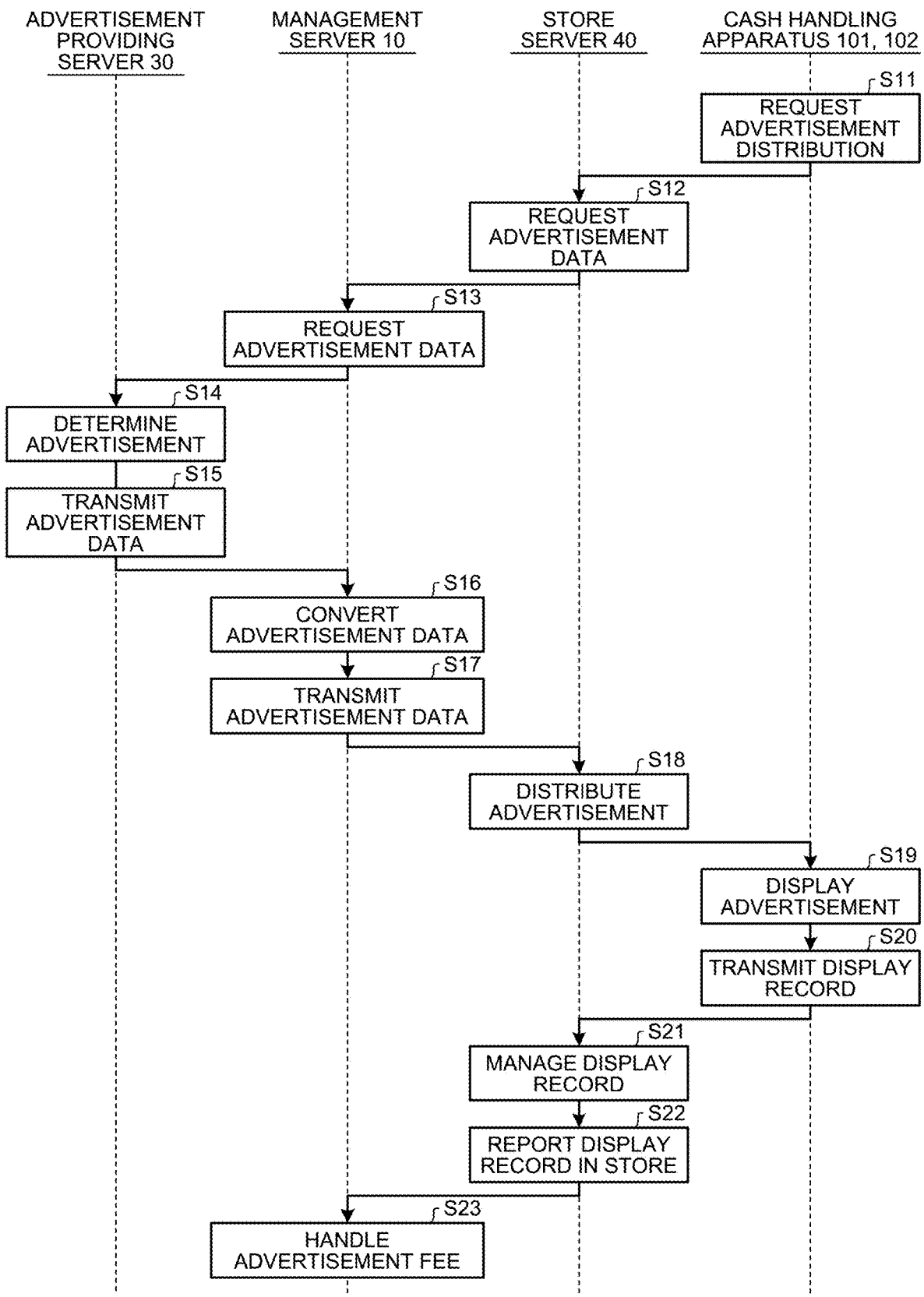

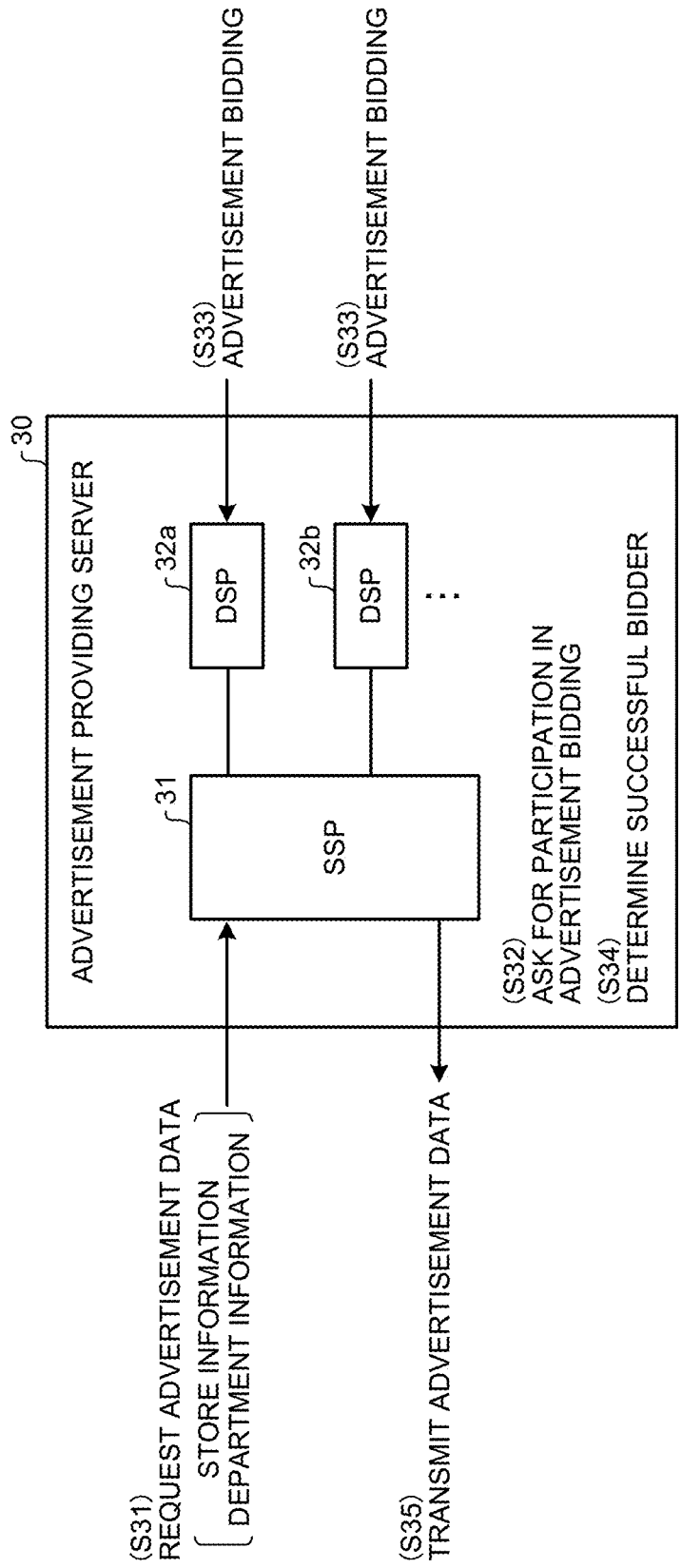

ADVERTISEMENT DISTRIBUTION SYSTEM

CROSS-REFERENCE TO RELATED APPLICATION

The present application claims priority to Japanese Patent Application No. 2022-034215, filed Mar. 7, 2022, the entire contents of which being incorporated herein by reference.

TECHNICAL FIELD

The present disclosure relates to an advertisement distribution system for distributing advertisements.

BACKGROUND ART

Conventionally, advertisements have been displayed on display devices installed in various places. For example, U.S. Pat. No. 7,739,144 discloses a technology in which a server provided with a database of advertisement data displays an advertisement on a transaction screen of an automated teller machine (ATM) via a network. Each of advertisers operates a terminal device connected to the server to generate advertisement data. The advertisers can designate a text and an image to be displayed as an advertisement, the font and color of the text, and a music to be played when the advertisement is displayed. Furthermore, the advertisers can select, as distribution conditions, a time period for displaying the generated advertisement data, and an ATM that displays the advertisement. When a customer starts operating an ATM, the ATM transmits identification information of the ATM and the current time to the server. Based on the ATM identification information and the time, the server selects advertisement data of which the distribution conditions are satisfied. The server distributes the advertisement data, which is selected to be displayed on the ATM at that time, to the ATM. The ATM displays the advertisement distributed from the server on the transaction screen. Thus, the advertisement prepared in advance can be displayed on the ATM that satisfies the distribution conditions of the advertisement.

SUMMARY

In the conventional technology described above, effective advertisement display cannot be performed in some cases. For example, although the advertisers are uniformly charged the same advertisement fee, some advertisements are displayed on ATMs for a longer time than other advertisements depending on the usage status of the ATMs. The advertisement displayed for a shorter time may not be regarded as effective for an advertiser that desires high cost-effectiveness. For another example, there is a case where a displayed advertisement does not match the needs of the ATM customers who see the advertisement. In such cases, the advertisements may not have advertising effects desired by the advertisers.

The present disclosure is made in view of the problem of the conventional art. The present disclosure addresses the problem, as discussed herein, with an advertisement distribution system capable of performing effective advertisement display.

An advertisement distribution system according to the present disclosure is for distributing an advertisement to at least one terminal apparatus installed in a store. The advertisement distribution system includes: a management server configured to manage a plurality of advertisements; and a store server configured to select, based on a distribution condition that has been set for each of the plurality of advertisements, an advertisement to be distributed and a terminal apparatus to be a distribution destination of the advertisement, and distribute the advertisement to the terminal apparatus. The terminal apparatus displays the advertisement distributed from the store server, and outputs information on a display record, which is a record of actual display on the terminal apparatus, of the advertisement. The management server manages, based on the information outputted from the terminal apparatus, the display record of each of advertisements that have been actually displayed in the store.

The objects, features, advantages, and technical and industrial significance of this disclosure will be better understood by the following description and the accompanying drawings of the disclosure.

BRIEF DESCRIPTION OF THE DRAWINGS

FIG. 2 is a chart diagram showing an example of a process performed in the advertisement distribution system;

FIG. 3 illustrates an example of an advertisement display method;

FIG. 5 illustrates an example of a management method of display records of advertisements;

FIG. 6 shows an example of advertisement information managed by a management server;

FIG. 7 is a chart diagram showing an example of processes for acquiring advertisement data when an advertisement is to be displayed; and FIG. 8 illustrates an example of a method by which an advertisement providing server determines an advertisement content.

DESCRIPTION OF EMBODIMENTS

Figure 1:
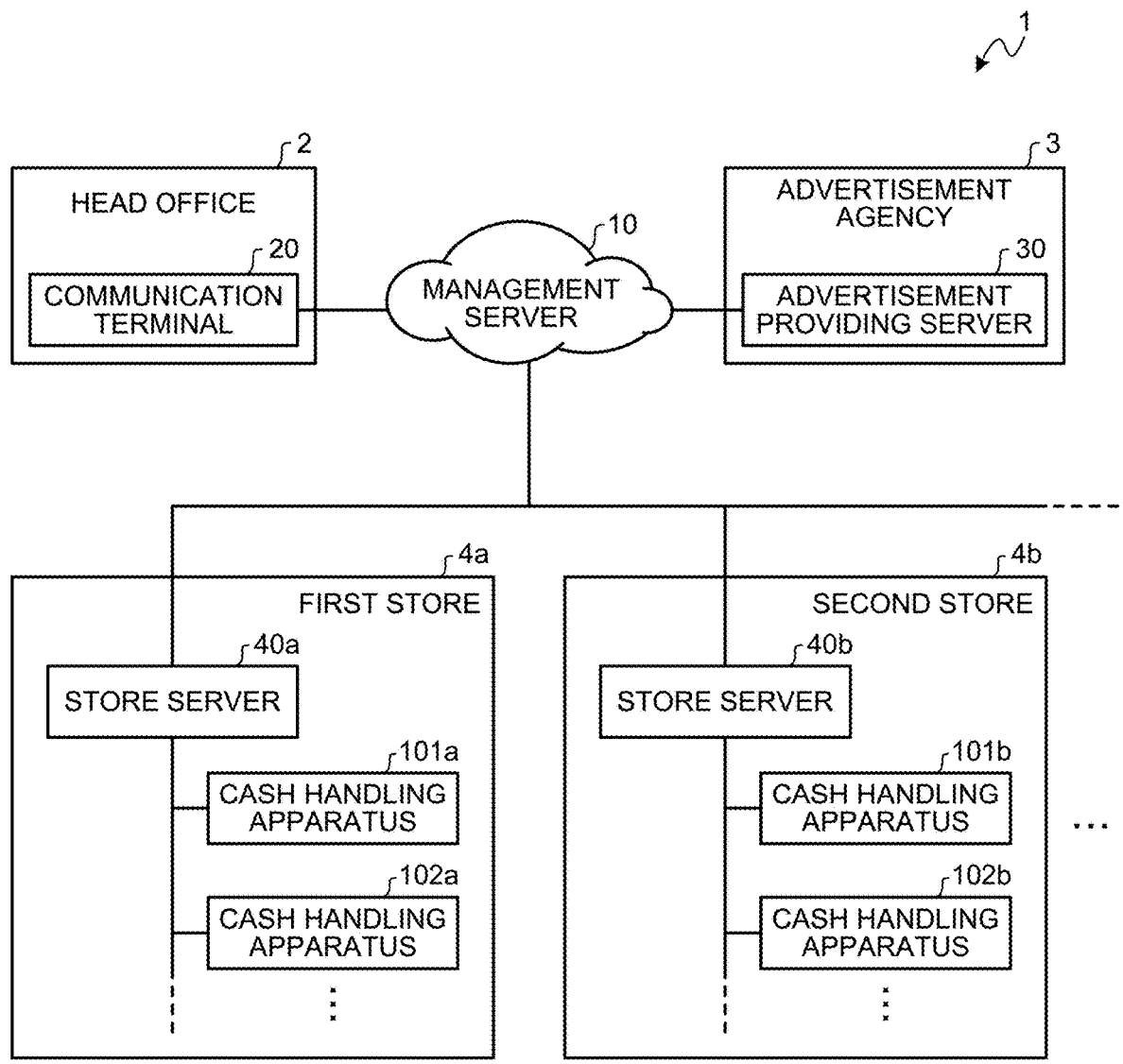
FIG. 1 is a schematic diagram showing an example of a configuration of an advertisement distribution system according to the present embodiment.

Hereinafter, an embodiment of an advertisement distribution system according to the present disclosure will be described with reference to the drawings. FIG. 1 is a schematic diagram showing an example of a configuration of an advertisement distribution system 1 according to the present embodiment. The advertisement distribution system 1 shown in FIG. 1 is a cloud system that is built on the Internet. In the advertisement distribution system 1, a cloud service for advertisement distribution is provided by a management server 10. The management server 10 is a cloud server, for example. The management server 10 is not limited to a virtual server that is intangible. The management server 10 may be a tangible server device implemented by a computer device.

In the advertisement distribution system 1, advertisements are distributed to terminal apparatuses respectively installed in a plurality of stores 4 (4a, 4b). The advertisements are displayed on displays of the terminal apparatuses in the stores 4. The number and types of the stores 4 are not particularly limited. Also, the number and types of the terminal apparatuses are not particularly limited. Hereinafter, a description will be given of a case where the terminal apparatuses are cash handling apparatuses 101 (101a, 101b) installed in a first store 4a and cash handling apparatuses 102 (102a, 102b) installed in a second store 4b. The cash handling apparatuses 101, 102 serve as terminal apparatuses that displays advertisements. The types of the cash handling apparatuses 101, 102 are not particularly limited. For example, an apparatus such as an ATM; a change machine; a vending machine; a settlement machine used for settlement of a transaction amount at the time of a transaction with a customer; and a change handling machine that can dispense change to be returned to the customer at the time of the transaction, can be used as the cash handling apparatuses 101, 102. Hereinafter, a description will be given of a case where the cash handling apparatuses 101, 102 are settlement machines installed at checkout counters of the stores 4.

As shown in FIG. 1, the advertisement distribution system 1 includes: the management server 10; the cash handling apparatuses 101, 102; and a store servers 40. The management server 10 can manage a plurality of advertisements. The store servers 40 (40a, 40b) can acquire advertisements from the management server 10. The cash handling apparatuses 101, 102 can display the advertisements distributed by the store servers 40. The advertisement distribution system 1 may include a communication terminal 20 for accessing and operating the management server 10. Various operations on advertisements can be performed on the management server 10 through the communication terminal 20. The advertisement distribution system 1 may include an advertisement providing server 30 used by the management server 10. The advertisement providing server 30 can provide various kinds of advertisement data.

The store servers 40 are computer devices, for example. The store servers 40 access the management server 10. Each store 4a, 4b is provided with at least one store server 40a, 40b. The store server 40 is communicably connected to the cash handling apparatuses 101, 102 in the store 4 via a network.

The store server 40 can manage places where the cash handling apparatuses 101, 102 are installed. Examples of the installation places include floors, departments, and checkout lanes where the cash handling apparatuses 101, 102 are installed. For example, the store server 40 uses, as identification information, an IP address in an in-store network, a MAC address, or the like of the each cash handling apparatus 101, 102. Specifically, the store server 40 associates the identification information with the installation place of each cash handling apparatus 101, 102, and specifies the installation place based on the identification information of each cash handling apparatus 101, 102. When distributing an advertisement to each cash handling apparatus 101, 102, the store server 40 can select an advertisement from among advertisements prepared in advance, according to the installation place of the cash handling apparatus 101, 102.

In the advertisement distribution system 1, various operations such as confirmation of various kinds of information and setting related to advertisement distribution are allowed on the management server 10. The operations are performed by using a communication device, which can access the management server 10, such as a computer device, a tablet device, or a smartphone. As shown in FIG. 1, for example, a head office 2 that manages the stores 4 can access the management server 10 through the communication terminal 20, and perform various operations on advertisements to be distributed to the stores 4.

FIG. 2 is a chart diagram showing an example of a process performed in the advertisement distribution system 1. First, the head office 2 sets a distribution destination of an advertisement by operating the communication terminal 20 connected to the management server 10 (step S1). The head office 2 can designate the store 4 or the cash handling apparatus 101, 102 as the distribution destination of the advertisement.

The head office 2 sets the content of the advertisement to be distributed to the distribution destination set in step S1 (step S2). The head office 2 can designate, as the advertisement content, advertisement data prepared in advance in the management server 10. Alternatively, the head office 2 can acquire advertisement data into the management server 10 from the advertisement providing server 30 which provides the advertisement data prepared in advance by an advertisement agency 3, and designate the acquired advertisement data as the advertisement content.

The head office 2 sets distribution conditions for each advertisement content (step S3). For example, the head office 2 can designate a time period in which an advertisement is to be distributed. The time period can be set by specifying at least one of date, day of week, and time of day. For another example, the head office 2 can designate a range of temperature, humidity, or the like, as an advertisement distribution condition. As for a method for obtaining information of temperature, humidity, or the like, the store server 40 may acquire the information corresponding to an area where the store 4 is present, from a predetermined website, when the store server 40 performs advertisement distribution in the store 4. The store server 40 may acquire the information of temperature, humidity, or the like, from one or more devices having sensors such as a temperature sensor, a humidity sensor, or the like. The cash handling apparatus 101, 102 may include a temperature sensor and a humidity sensor, for example. In a case where the distribution conditions include conditions on the temperature, the humidity, or the like, the advertisement to be displayed on the cash handling apparatus 101, 102 can be changed according to the temperature, the humidity, or the like.

As described above, the user of the advertisement distribution system 1 can set the distribution destination of the advertisement, the content of the advertisement to be distributed, and the advertisement distribution conditions based on which the advertisement is to be distributed. The user can set the distribution conditions such that different advertisements are displayed depending on installation places and external conditions of the cash handling apparatuses 101, 102. For example, the distribution condition can be set such that different advertisements are displayed if any one of the checkout lane, the department, the floor, and the store 4 is different. For another example, the distribution condition can be set such that different advertisements are displayed if any one of the time period, the temperature, the humidity, etc., is different.

The setting operation on the advertisement may not necessarily be performed by the head office 2, and may be performed by the stores 4. The distribution conditions may not necessarily be limited to that for designating the time period in which the advertisement is displayed, and the external condition such as temperature, humidity, or the like. The distribution destination and/or the advertisement content may be included in the distribution condition in addition to the advertisement display conditions such as the time period and the external condition. External conditions other than temperature and humidity may be included in the distribution conditions. In a case where a point of sales (POS) system is used in the store 4, a distribution condition may be set such that an advertisement of an item is displayed based on item-based sales information managed by the POS system. For example, items may be ranked based on the monetary amount of sales or the sales volume of each item, and the distribution condition may be set such that the cash handling apparatus 101, 102 displays advertisements of well-selling items whose ranks are higher than a predetermined rank. For another example, the management server 10 may receive requests on advertisements of items from the POS system, and a distribution condition may be set such that the cash handling apparatus 101, 102 displays the advertisements of the items based on the requests received in the management server 10.

In a case where a store 4 is set as a distribution destination of the advertisement, the advertisement content and the distribution condition that are set by the management server 10 are transmitted to the store server 40 of this store 4. In a case where a cash handling apparatus 101, 102 is set as a distribution destination of the advertisement, the advertisement content and the distribution condition set by the management server 10 are transmitted to the store server 40 of the store 4 in which this cash handling apparatus 101, 102 is installed.

Upon receiving the advertisement content and the distribution condition, the store server 40 distributes the advertisement to each cash handling apparatus 101, 102, based on the distribution condition (step S4) as shown in FIG. 2. In the store 4, the advertisement set as the advertisement content is displayed on the display unit of the cash handling apparatus 101, 102 set as the distribution destination (step S5). The cash handling apparatus 101, 102 having displayed the advertisement reports an advertisement display record to the store server 40 (step S6). The display record is a track record of the advertisement that has been actually displayed on the cash handling apparatus 101, 102. The display record includes at least either the total number of times or the total display time that the advertisement has been actually displayed.

The display unit of the cash handling apparatus 101, 102 is provided for displaying information regarding cash handling. Therefore, the cash handling apparatus 101, 102 puts priority on display of information regarding cash handling rather than display of an advertisement. For example, in an idle time when cash handling is not performed, the cash handling apparatus 101, 102 requests the store server 40 to distribute an advertisement. Upon receiving this request, the store server 40 selects and distributes advertisement data to be displayed, based on the distribution condition, whereby the advertisement is displayed on the display unit of the cash handling apparatus 101, 102.

If cash handling needs to be started while the cash handling apparatus 101, 102 displays the advertisement, the cash handling apparatus 101, 102 interrupts display of the advertisement to start the cash handling. Therefore, the number of times of the advertisement distribution performed by the store server 40 and the advertisement display time calculated from the number of times of the advertisement distribution may sometimes be different from those of the advertisement actually displayed on the display unit of the cash handling apparatus 101, 102. The cash handling apparatus 101, 102 counts the number of times the advertisement has been actually displayed on the display unit. Also, the cash handling apparatus 101, 102 counts the display time of the advertisement that has been actually displayed on the display unit. The cash handling apparatus 101, 102 transmits a display record including the number of times and the display time of the advertisements, to the store server 40.

For example, when the advertisement data includes audio data or video data, the cash handling apparatus 101, 102 counts the number of times of the advertisement data display as 1, on condition that the whole of the audio or the whole of the video has been played by using the display unit of the cash handling apparatus 101, 102. If the play of the audio or the video is interrupted in the middle of the play, this is not counted and is not included in the number of times of the advertisement data display. For another example, when the advertisement data includes text data or still image data, the cash handling apparatus 101, 102 counts the number of times of the advertisement data display as 1, on condition that the text or the still image has been continuously displayed for a predetermined time. If the display time is less than the predetermined time, this is not counted and is not included in the number of times of advertisement data display. For example, in a case where one advertisement spot for the advertisement data including the audio data or the video data is set to be 15 seconds, the number of times of the advertisement data of the text data or the still image data may also be counted as 1 when they are displayed for 15 seconds. In a case where an advertiser has to pay an advertisement fee according to the display time of the advertisement data, the advertisement fee can be calculated based on the display time of the advertisement included in the display record obtained by the cash handling apparatus 101, 102. Alternatively, the advertisement fee can be calculated based on the number of times of the advertisement display included in the display record, and the display time of the advertisement per one display.

Even during cash handling, the cash handling apparatus 101, 102 can display an advertisement on a part of the screen. Although a specific display mode will be described later, the advertisement is displayed continuously on the screen even during the cash handling. In this case, the display mode, by which an advertisement has been displayed on a part of the screen, may be included in the display record. For example, the display record may be managed such that partial screen display is counted as 1, partial screen display for a predetermined time (e.g., 15 seconds) is counted as 1, and so on. In a case where an advertisement fee is set to be paid not based on the number of times of display and the display time but based on the display mode, the display mode may be used as the display record. For example, in a case where an advertisement fee is set to be paid when an advertisement text or image is continuously displayed on a partial area of the screen of the cash handling apparatus 101, 102, a display mode such as a text display mode or an image display mode may be included in the display record and managed.

As described above, in the advertisement distribution system 1, the cash handling apparatus 101, 102 determines whether or not an advertisement can be displayed on the display unit. The cash handling apparatus 101, 102 displays the advertisement based on the determination result, and outputs the display record of the advertisement that has been actually displayed on the display unit. The cash handling apparatus 101, 102 can include, in the display record, at least one of: the number of times the advertisement is displayed; the display time of the advertisement; and the display mode of the advertisement.

The store server 40 manages the display records received from the cash handling apparatuses 101, 102 (step S7) as shown in FIG. 2. The store server 40 reports the display record of each advertisement in the store 4 to the management server 10 (step S8). For example, after business hours of the day in the store, information on the advertisements displayed on the cash handling apparatuses 101, 102 during the business hours and the display records of the respective advertisements are transmitted from the store server 40 to the management server 10. For another example, at a predetermined timing such as the last day of the week or month, information including the display records of the advertisements are transmitted from the store server 40 to the management server 10.

Based on the information received from each store server 40, the management server 10 can manage the advertisements that have been displayed on the cash handling apparatuses 101, 102 and the display records of these advertisements. The management server 10 can handle an advertisement fee calculated based on the display record of each advertisement (step S9). If an advertisement fee is to be paid from the advertiser according to the number of times that the advertisement is displayed on the cash handling apparatuses 101, 102, the advertisement fee is calculated based on the number of times of the advertisement display. If an advertisement fee is to be paid from the advertiser according to the time that the advertisement is displayed on the cash handling apparatuses 101, 102, the advertisement fee is calculated based on the advertisement display time. If an advertisement fee is to be paid from the advertiser according to the display mode of the advertisement, the advertisement fee is calculated based on the advertisement display mode.

The management server 10 can perform a process of charging the calculated advertisement fee. For example, the management server 10 notifies the advertiser, thorough a communication terminal used by the advertiser, of the number of times of advertisement display and/or the advertisement display time, and the advertisement fee calculated based thereon, whereby payment of the advertisement fee is performed by the advertiser. For another example, the management server 10 notifies the advertiser, through the communication terminal used by the advertiser, of the advertisement fee calculated based on the advertisement display mode, whereby payment of the advertisement fee is performed by the advertiser.

FIG. 3 illustrates an example of an advertisement display method. As shown in FIG. 3, distribution destinations set in the management server 10 may include an area, a store, a floor, a department, a checkout lane, and a cash handling apparatus 101, 102. For example, an area manager in the head office 2 who manages a plurality of stores 4 in a predetermined area can designate, as distribution destinations, all the cash handling apparatuses 101, 102 installed in all the stores 4 in the area by designating "area". Likewise, by designating "floor", "department", or "checkout lane" in the store 4, the area manager can designate, as distribution destinations, all the cash handling apparatuses 101, 102 installed in any of these places. Alternatively, the area manager can designate each of the cash handling apparatuses 101, 102 as distribution destinations.

Advertisement contents that can be set in the management server 10 include text data, sound data, still image data, and moving image data. These pieces of data may be prepared in advance in the management server 10 or may be acquired from the advertisement providing server 30 by the management server 10.

The text data includes at least one of numbers, characters, and symbols. The text data may be formatted data such as HTML. The still image data may be an image including text. The sound data may be a voice that vocalizes an advertisement content, or may be music that is played while displaying an advertisement. The text data, the sound data, the still image data, or the moving image data may be solely set as an advertisement content, or a plurality of pieces of data may be set as an advertisement content. For example, when the still image data and the sound data are set as advertisement contents, the cash handling apparatus 101, 102 reproduces the sound data with a speaker while displaying the still image data on the display unit.

The distribution conditions in the management server 10 can include at least one of date, day of week, time of day, and a time period. The time period can be designated by using at least one of date, day of week and time of day. If one or a plurality of dates are set in the distribution condition, the advertisement is distributed on the set dates. If one or a plurality of days of week are set in the distribution condition, the advertisement is distributed on the set days of week. If one or a plurality of times of day are set in the distribution condition, the advertisement is distributed on the set times of day. If one or a plurality of time periods are set in the distribution condition, the advertisement is distributed in the set time periods.

Based on the distribution destination, the advertisement content, and the distribution condition set in the management server 10, the management server 10 transmits information on the advertisement to the store server 40. During the business hours of the store 4, the management server 10 selects the advertisement data and the distribution destination based on the distribution condition, and distributes the selected advertisement data to the selected distribution destination.

Based on the distribution destination, the advertisement content and the distribution condition received from the management server 10, the store server 40 manages correspondence between the advertisement data, the advertisement display place where the advertisement data is to be displayed, and the advertisement distribution time period during which the advertisement data is to be distributed. The store server 40 stores the advertisement data acquired from the management server 10 into a memory in the store server 40. Likewise, the advertisement data, the advertisement display place and the advertisement distribution time period are managed in the store server 40 of each store 4.

Upon receiving an advertisement distribution request from the cash handling apparatus 101, 102 capable of displaying an advertisement, the store server 40 determines advertisement data to be displayed on the cash handling apparatus 101, 102, based on the requested time of day and the place such as a floor, a department, a checkout lane, or the like where the cash handling apparatus 101, 102 is installed. Based on the determination result, the store server 40 distributes the advertisement data to the cash handling apparatus 101, 102.

The cash handling apparatus 101, 102 displays the advertisement data received from the store server 40 on the display unit. When the cash handling apparatus 101, 102 is capable of displaying an advertisement, an advertisement, which is to be displayed at the installation place of the cash handling apparatus 101, 102 in that time period of the day, is displayed on the display unit. For example, the advertisement is displayed while the cash handling apparatus 101, 102 does not perform cash handling processes.

As shown in FIG. 3, even in the same time period, different advertisements can be displayed on the display units of the respective cash handling apparatuses 101, 102 in the store 4. For example, an advertisement of a food product is displayed on the display unit of the cash handling apparatus 101 installed in a grocery department while an advertisement of a daily use item is displayed on the display unit of the cash handling apparatus 102 installed in a daily goods department.

As described above, the distribution destination, the advertisement content, and the distribution condition are set in the management server 10 such that an advertisement is selected depending on the place and the time of day at which the advertisement is displayed. Therefore, the advertisement that matches the needs of customers of the store 4 can be displayed on the cash handling apparatus 101, 102 to achieve a high advertisement effect.

Figure 4A:
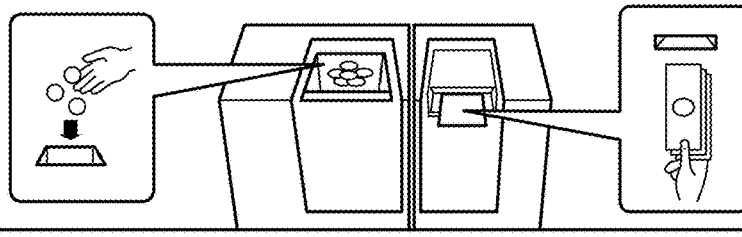
FIGS. 4A, 4B and 4C show examples of screens displayed on a display unit of a cash handling apparatus.
Figure 4B:
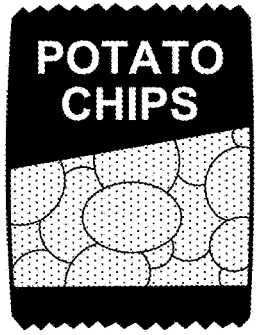
Figure 4C:
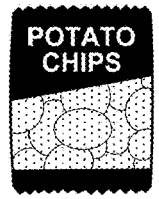

FIGS. 4A, 4B and 4C show examples of screens displayed on the display unit of the cash handling apparatus 101, 102. As shown in FIG. 4A, while cash handling is being performed in the cash handling apparatus 101, 102, information on the cash handling is displayed on the display unit of the cash handling apparatus 101, 102. When cash handling is not performed in the cash handling apparatus 101, 102, an advertisement distributed from the store server 40 is displayed on the display unit of the cash handling apparatus 101, 102 as shown in FIG. 4B.

The cash handling apparatus 101, 102 may display, even when a cash handling process is being performed therein, an advertisement on one or more processing screens to be displayed during the cash handling process. For example, the cash handling apparatus 101, 102 may be set to display a screen shown in FIG. 4C instead of the screen shown in FIG. 4A. The cash handling apparatus 101, 102 counts the number of times the advertisement has been displayed as shown in FIG. 4B or FIG. 4C. The cash handling apparatus 101, 102 counts the display time during which the advertisement has been displayed as shown in FIG. 4B or FIG. 4C. The cash handling apparatus 101, 102 transmits the number of times and/or the display time of the advertisement, as a display record, to the store server 40. For another example, the cash handling apparatus 101, 102 can continuously display a text, a still image, a moving image, or the like of an advertisement on a partial area of the screen even during the cash handling. In this case, the cash handling apparatus 101, 102 may transmit the display mode such as the text display mode, the image display mode, the video display mode, etc., to the store server 40 as a display record.

In the cash handling apparatus 101, 102, the counting method of the number of times of advertisement display and/or the measuring method of the advertisement display time can be changed between the case where the advertisement is displayed on the full screen as shown in FIG. 4B and the case where the advertisement is displayed on a part of the screen as shown in FIG. 4C. For example, the number of times of advertisement display is counted as 1 when the advertisement is displayed on the full screen as shown in FIG. 4B, while the number of times of advertisement display is counted as 0.5, which is the smaller number than 1, when the advertisement is displayed on a part of the screen as shown in FIG. 4C. For another example, the advertisement display time is counted as 15 seconds when the advertisement is displayed for 15 seconds on the full screen as shown in FIG. 4B, while the advertisement display time is counted as 7.5 seconds when the advertisement is displayed for 15 seconds on a part of the screen as shown in FIG. 4C. That is, the display time may be counted as shorter time than the time that the advertisement has been actually displayed.

If the same advertisement fee as that for full-screen display is to be paid even when an advertisement is displayed on a part of the screen, the advertisement displayed on a part of the screen may be counted in the same manner as that for the full-screen display. If an advertisement fee for partial-screen display and an advertisement fee for full-screen display are separately set, the number of times and the display time of the partial-screen display is counted in the same manner as that for the full-screen display and counted result is managed in association with the display mode indicating whether the advertisement is displayed in the partial-screen mode or the full-screen mode. For example, an advertisement displayed for 15 seconds on the full screen may be managed as "one full-screen display", while an advertisement displayed for 15 seconds on a part of the screen may be managed as "one partial-screen display". The advertisement displayed for 15 seconds on the full screen may be managed as "15 seconds full-screen display", while the advertisement displayed for 15 seconds on a part of the screen may be managed as "15 seconds partial-screen display". If an advertisement fee is paid according to the display mode, the display mode may be managed in a display record. For example, if an advertisement fee is set to be paid for a text, a still image, or a moving image that are continuously displayed on a part of the screen, the display record of such an advertisement may include "text display mode", "image display mode", or "video display mode" without including the display time and the number of times of the advertisement display.

FIG. 5 illustrates an example of a management method of display records of advertisements. The store server 40 of each store 4 manages display records of advertisements displayed in the store 4, based on the display records received from the cash handling apparatuses 101, 102. For example, the store server 40*a* of the first store 4*a* specifies advertisements displayed on the cash handling apparatuses 101*a*, 102*a* in the first store 4*a*, accumulates the number of times of and the display time of each advertisement, and manages them as shown in FIG. 5. Likewise, the store server 40*b* of the second store 4*b* manages the advertisements displayed on the cash handling apparatuses 101*b*, 102*b* in the second store 4*b*, and the total number of times and the total display time of each advertisement.

The management server 10 accumulates the number of times and the display time of each advertisement displayed in each store 4. For example, the number of times and the display time are accumulated for each advertisement as shown in FIG. 5. Based on the accumulation result, the management server 10 can perform a process of charging an advertisement fee for each advertisement. As for an advertisement of which the advertisement fee is calculated based on the number of times of the advertisement display, the management server 10 performs the charging process based on the number of times of the advertisement display. As for an advertisement of which the advertisement fee is calculated based on the display time of the advertisement, the management server 10 performs the charging process based on the display time of the advertisement. For example, information on the number of times or the display time of the advertisement is notified from the management server 10 to the advertiser through the communication terminal used by the advertiser, and the advertisement fee is paid from the advertiser.

Likewise, as for an advertisement of which the display record is managed based on the display mode, the display record is managed by each of the store servers 4*a*, 4*b*, and the advertisement fee for the advertisement is accumulated and charged by the management server 10. As for an advertisement of which the advertisement fee is calculated based on the display mode, the management server 10 performs the charging process based on the display mode. For example, information on the display mode is notified from the management server 10 to the advertiser through the communication terminal used by the advertiser, and the advertisement fee is paid from the advertiser.

The management server 10 can manage, as advertisement information, information of advertisements that have been displayed in each of stores of each of companies using the advertisement distribution system 1. FIG. 6 shows an example of advertisement information managed by the management server 10. In the example shown in FIG. 6, the advertisement information includes items of "company", "store", "advertisement", and "apparatus". A display record of each item includes at least either the number of times of advertisement display or the advertisement display time.

Under the item of "company", a display record of advertisements that have been displayed by each company, and an advertisement fee to be paid to each company based on the display record are registered for each of companies. Under the item of "store", a display record of advertisements that have been displayed by each store, and an advertisement fee to be paid to each store based on the display record are registered for each of stores. The display records and the advertisement fees under the item of "store" correspond to a store-based breakdown of those under the item of "company". For example, when the first store 4a and the second store 4b are stores of the same company A, the advertisement fees obtained by the stores 4a, 4b are included in the advertisement fee obtained by the company A. Under the item of "advertisement", a display record of each advertisement and an advertisement fee to be paid based on the display record are registered for each of advertisements. The display records and the advertisement fees under the item of "advertisement" correspond to an advertisement-based breakdown of those under the item of "store". For example, the advertisement fee to be paid to the first store 4a includes: an advertisement fee obtained by displaying an advertisement of a company P; and an advertisement fee obtained by displaying an advertisement of a company Q. Under the item of "apparatus", a display records of each advertisement displayed by the cash handling apparatus 101, 102, and an advertisement fee to be paid based on the display record are registered for each of the cash handling apparatuses 101, 102. The display records and the advertisement fees under the item of "apparatus" correspond to an apparatus-based breakdown of those under the item of "advertisement". For example, the advertisement fee that the first store 4a obtains by displaying the advertisement of the company P includes: an advertisement fee obtained by displaying the advertisement on a cash handling apparatus Xa; and an advertisement fee obtained by displaying the advertisement on a cash handling apparatus Ya.

The management server 10 can perform a payment process of paying an advertisement fee to a company or a store while managing the advertisement fees as shown in FIG. 6. For example, the management server 10 transmits, to an external server that performs handling of accounts of financial institutions, an advertisement fee, account information of an advertiser as a payer of the advertisement fee, and account information of a company or a store as a payee of the advertisement fee, thereby performing account handling for depositing the advertisement fee from the account of the advertiser to the account of the company or the store.

FIG. 2 shows the case where the advertisement display is performed using the advertisement data stored in the management server 10. However, in the advertisement distribution system 1, it can be set that the management server 10 acquires, when displaying an advertisement, advertisement data from the advertisement providing server 30.

FIG. 7 is a chart diagram showing an example of processes for acquiring advertisement data when an advertisement is to be displayed. The cash handling apparatus 101, 102 requests the store server 40 to distribute an advertisement (step S11). Upon receiving the request, the store server 40 requests the management server 10 to provide advertisement data (step S12). At this time, the store server 40 can transmit information on an advertisement display unit to the management server 10. For example, a display size and a resolution of the display unit included in the cash handling apparatus 101, 102 are transmitted to the management server 10.

The store server 40 can transmit information on an advertisement display environment. For example, information on at least either the store 4 or the department where the cash handling apparatus 101, 102 is installed is transmitted to the management server 10. The management server 10 can specify the type of the store 4, in which an advertisement is displayed, based on the information on the store 4. The management server 10 can specify the type of items sold at the department, in which an advertisement is displayed, based on the information on the department.

The management server 10 requests the advertisement providing server 30 to provide advertisement data (step S13). At this time, the management server 10 can transmit at least either the store information or the department information to the advertisement providing server 30.

The advertisement providing server 30 determines an advertisement content, i.e., advertisement data to be transmitted to the management server 10 (step S14). The advertisement providing server 30 determines the advertisement data, based on the time at which the advertisement data is requested and on the store information and the department information of the store 4 that is requesting the advertisement data. A method of determining advertisement data will be described later. The advertisement providing server 30 transmits the determined advertisement data to the management server 10 (step S15).

The management server 10 can convert the advertisement data received from the advertisement providing server 30 into a data format suitable for displaying on the cash handling apparatus 101, 102 (step S16). For example, when the advertisement data is still image data or moving image data, the management server 10 can change at least either the number of colors or the resolution of the data in accordance with the display size and the resolution of the display unit of the cash handling apparatus 101, 102. Also, the management server 10 can change the image file format of the still image and the video file format of the moving image in accordance with the display format of the display unit of the cash handling apparatus 101, 102. However, step S16 may not necessarily be performed and therefore, conversion of the advertisement data may not be performed.

The management server 10 transmits the advertisement data obtained from the advertisement providing server 30 to the store server 40 (step S17). The store server 40 distributes the advertisement data received from the management server 10, to the cash handling apparatus 101, 102 (step S18). The cash handling apparatus 101, 102 displays the advertisement data received from the store server 40 (step S19). Since the processes in steps S18 to S23 are performed in the same way as the processes in steps S4 to S9 described with reference to FIG. 2, repeated description is omitted.

FIG. 8 illustrates an example of a method by which the advertisement providing server 30 determines the advertisement content. As shown in FIG. 8, the advertisement providing server 30 includes a supply side platform (SSP) 31 and demand side platforms (DSPs) 32 (32a, 32b). The advertisement providing server 30 can determine an advertisement content through bidding by using the SSP 31 and the DSPs 32.

Upon receiving the request for advertisement data, the store information, and the department information at the SSP 31 (step S31), the advertisement providing server 30 asks a plurality of advertisers to bid for an advertisement (step S32). For example, the advertisement providing server 30 notifies the plurality of advertisers of the store information and the department information, and asks for bidding. The store information includes at least one of: the name of the store 4; the location of the store 4; and the area (e.g., the square footage) of the store 4, for example. The department information includes at least one of: the area (e.g., the square footage) of the department; the type of items that are being sold at the department; and the number of items that are being sold at the department, for example. Based on the store information, the department information and the time of the day at which each advertiser is asked for bidding, the advertiser determines advertisement data to be displayed in the store 4 and a bid price, i.e., an advertisement fee to be paid to the store 4, and participates in bidding (step S33).

Upon receiving the bids from the advertisers at the DSPs 32, the advertisement providing server 30 determines, as a successful bidder, an advertiser that offers the highest bid price (step S34). The advertisement providing server 30 transmits the advertisement data of the advertiser determined as the successful bidder to the management server 10 (step S35). The advertisement providing server 30 notifies the management server 10 of the advertisement fee to be paid from the advertiser to the store 4 when the transmitted advertisement data is displayed in the store 4. For example, an advertisement fee per advertisement display or an advertisement fee per predetermined time is notified from the advertisement providing server 30 to the management server 10.

Thereafter, the advertisement data of the advertiser is displayed on the cash handling apparatus 101, 102 in the store 4, and the advertisement fee is calculated based on the display record. As described above, the management server 10 may perform the process of charging the advertisement fee on the advertiser. Alternatively, the management server 10 may transmit information including the display record of the advertisement to the advertisement providing server 30, and the advertisement providing server 30 may perform the charging process.

In step S12 in FIG. 7, the management server 10 can receive, from the store server 40, information such as the advertisement display unit, the advertisement display environment, and the like. However, the management server 10 may not necessarily receive these pieces of information from the store server 40. For example, the management server 10 may acquire and manage in advance pieces of information on advertisements to be displayed in each store 4, and may specify information on an advertisement upon receiving predetermined information from the store server 40.

For example, the management server 10 acquires and manages apparatus identification information of each of the cash handling apparatuses 101, 102 in each store 4. The management server 10 can identify the cash handling apparatus 101, 102 based on the apparatus identification information. For example, the apparatus identification information may include the model number and the serial number of the cash handling apparatus 101, 102. The management server 10 can manage various kinds of apparatus information in association with the apparatus identification information. The apparatus information may include information on the place where the corresponding apparatus is installed, such as country, city, store 4, floor, department, or checkout lane. The apparatus information may also include system information of the corresponding apparatus, such as OS (Operating System), language, display size, or resolution. Also, the apparatus information may include information on the display format of an advertisement to be displayed on the corresponding apparatus, such as text, sound, still image, or moving image. The management server 10, in step S12 in FIG. 7, may receive apparatus identification information of the cash handling apparatus 101, 102 from the store server 40 and specify apparatus information. Then, the management server 10, in step S13, may request the advertisement providing server 30 to provide advertisement data by using the specified apparatus information. By using the apparatus information, the management server 10 can request an advertisement that matches the conditions such as the installation place, system, display format, and the like of the cash handling apparatus 101, 102. Thus, the cash handling apparatus 101, 102 can display the advertisement according to the installation place, in the display format according to the display unit. Moreover, the cash handling apparatus 101, 102 can display an advertisement that is prepared according to the culture and language of the country.

The apparatus information that is managed by the management server 10 in association with the apparatus identification information may include information indicating the type of business of the store 4, such as a supermarket or a home center, in which the cash handling apparatuses 101, 102 are installed. The apparatus information may include information indicating the type of advertisement that is desired to be displayed on the cash handling apparatuses 101, 102, and may include information indicating the type of advertisement that is prohibited from being displayed on the cash handling apparatuses 101, 102. The information on the type of advertisement may include information indicating the advertiser, information indicating the business type of the advertiser, and information indicating the field of items and services to be advertised. The management server 10 can use these pieces of information when requesting the advertisement providing server 30 to provide advertisement data of an advertisement to be displayed in the store 4. For example, the store server 40 can request the advertisement providing server 30 to avoid an advertisement of a competitor company of the same business field as the store 4. The store server 40 can request the advertisement providing server 30 to give priority to an advertisement of predetermined companies such as affiliated companies and group companies. The advertisement providing server 30 can select an advertiser that matches the request received from the management server 10 in step S31 in FIG. 8, and ask the selected advertiser to participate in bidding for an advertisement in step S32. Thus, an advertisement of the type desired by the head office 2 and the store 4 can be preferentially displayed on the cash handling apparatus 101, 102. An advertisement of the type that is undesirable for the head office 2 and the store 4 can be avoided from being displayed on the cash handling apparatus 101, 102.

The apparatus identification information and the apparatus information can also be used in the process described with reference to FIG. 2. In the case where the head office 2 or the store 4 sets the advertisement content by operating the communication terminal 20 connected to the management server 10 as shown in FIG. 2, when the cash handling apparatus 101, 102 for displaying the advertisement has been determined, the management server 10 specifies apparatus information of this apparatus. For example, the management server 10 displays the apparatus information on the screen of the communication terminal 20, whereby the head office 2 or the store 4 can check the apparatus information and set the advertisement content so as to satisfy the apparatus information. Alternatively, for example, the management server 10 performs filtering of the advertisement data, based on the apparatus information, whereby the advertisement content that is selectable by the head office 2 or the store 4 can be limited to the filtered advertisement data. Thus, appropriate advertisement data can be displayed on the cash handling apparatus 101, 102.

FIG. 2 of the present embodiment shows the case where the head office 2 operates the communication terminal 20 connected to the management server 10 to perform setting on an advertisement to be displayed in the store 4. However, the entity that performs setting on an advertisement is not limited to the head office 2. The store 4 or the advertisement agency 3 may perform the setting on the advertisement.

FIG. 2 and FIG. 7 of the present embodiment show the case where the head office 2 or the store 4 obtains an advertising revenue by displaying an advertisement of an advertiser. However, it is also possible to display an advertisement of the head office 2 and/or the store 4 on the cash handling apparatus 101, 102. As described with reference to FIG. 3, if advertisement data of the head office 2 and/or the store 4 is set as an advertisement content when the setting on an advertisement is performed in the management server 10, advertisement display according to the set advertisement data is performed on the cash handling apparatus 101, 102. For example, when the setting is performed such that an advertisement of the store 4 is displayed in a certain time period while an advertisement of an advertiser is displayed in the other time period to obtain an advertisement revenue, advertisement display is performed based on this setting. Also in such a case, an advertisement fee is charged to the advertiser, based on a display record of the advertisement that has actually been displayed.

In the present embodiment, advertisement distribution by the store server 40 is performed based on a request from the cash handling apparatus 101, 102. However, advertisement distribution may be performed without receiving requests from the cash handling apparatus 101, 102. For example, in the advertisement distribution, the store server 40, which manages data under items of "display place", "distribution time period", and "advertisement data" as shown in FIG. 3, may transmit data registered under the item of "advertisement data" to the cash handling apparatus 101, 102 corresponding to data registered under the item of "display place", based on data registered under the item of "distribution time period". In this case, the cash handling apparatus 101, 102 may store the advertisement data received from the store server 40 into the memory inside the apparatus, determines a timing at which the advertisement can be displayed, displays the advertisement at the timing, and transmits a display record to the management server 10.

The advertisement distribution system according to the present disclosure is for distributing an advertisement to at least one terminal apparatus installed in a store. The advertisement distribution system includes: a management server configured to manage a plurality of advertisements; and a store server configured to select, based on a distribution condition that has been set for each of the plurality of advertisements, an advertisement to be distributed and a terminal apparatus to be a distribution destination of the advertisement, and distribute the advertisement to the terminal apparatus. The terminal apparatus displays the advertisement distributed from the store server, and outputs information on a display record, which is a record of actual display on the terminal apparatus, of the advertisement. The management server manages, based on the information outputted from the terminal apparatus, the display record of each of advertisements that have been actually displayed in the store.

In the above configuration, the terminal apparatus may be a cash handling apparatus including a display unit that displays information on cash handling when the cash handling apparatus performs the cash handling. The cash handling apparatus may display the advertisement at a timing when the advertisement can be displayed on the display unit, and output the information on the display record of the advertisement.

In the above configuration, the cash handling apparatus may be a change handling machine that dispenses change when a transaction with a customer is performed in the store.

In the above configuration, the cash handling apparatus may be an ATM.

In the above configuration, the terminal apparatus may output, as the display record, the number of times that each advertisement has been actually displayed on the terminal apparatus, and the management server may calculate an advertisement fee to be paid to the store, based on the number of times of display of the respective advertisements displayed in the store.

In the above configuration, the terminal apparatus may output, as the display record, a display time of each advertisement that has been actually displayed on the terminal apparatus, and the management server may calculate an advertisement fee to be paid to the store, based on the display time of the respective advertisements displayed in the store.

In the above configuration, the store server may select the advertisement to be distributed to the terminal apparatus based on information on the terminal apparatus.

In the above configuration, the store server may request the management server to provide an advertisement to be distributed to the terminal apparatus while designating the type of the advertisement, and the management server may acquire an advertisement that satisfies the request, from an advertisement providing server that provides various types of advertisements.

In the above configuration, the advertisement providing server may invite bids from advertisers of advertisements that satisfy the request from the store server, and the advertisement that the management server acquires from the advertisement providing server may be an advertisement of an advertiser that is a successful bidder.

In the above configuration, the management server may be a cloud server.

According to the advertisement distribution system of the present disclosure, effective advertisement display can be performed. For example, an advertisement fee according to the number of times that an advertisement has been actually displayed or the actual display time of the advertisement can be charged to an advertiser. For example, a high advertising effect can be expected in a store by distributing to the store an advertisement on items being sold in the store.

The components of the advertisement distribution system 1 according to the present embodiment are conceptually functional components, and thus may not necessarily be physically limited thereto. For example, the management server 10 may implement a part or the entirety of the functions and operations of the advertisement providing server 30, or may implement a part or the entirety of the functions and operations of the store server 40. The store server 40 may implement a part or the entirety of the functions and operations of the communication terminal 20, may implement a part or the entirety of the functions and operations of the management server 10, or may implement a part or the entirety of the functions and operations of the cash handling apparatus 101, 102. Distributed or integrated forms of each device are not limited to the forms described above, and all or some of the forms may be distributed or integrated functionally or physically in any unit depending on various loads, use statuses, or the like.

As described above, using the advertisement distribution system, a store can display an advertisement on a cash handling apparatus in an idle time when cash handling is not performed, and obtain an advertisement revenue. Since the advertisement is displayed according to the installation place of the cash handling apparatus and the time period for displaying the advertisement, a high advertisement effect can be achieved. Since an advertisement fee based on the number of times or the display time that the advertisement has been actually displayed is charged to advertisers, high cost effectiveness can be achieved for the advertisers.

What is claimed is:

1. An advertisement distribution system comprising:
    a management server configured to manage a plurality of advertisements;
    a store server; and
    at least one terminal apparatus, wherein
    the store server is configured to:
        select, based on a distribution condition that has been set for each of the plurality of advertisements, an advertisement to be distributed and a terminal apparatus among the at least one terminal apparatus to be a distribution destination of the advertisement, and
        distribute the advertisement to the selected terminal apparatus, the terminal apparatus is configured to:
        display the advertisement distributed from the store server, and
        output information on a display record, which is a record of actual display on the terminal apparatus, of the advertisement,
    the management server is further configured to manage, based on the information outputted from the terminal apparatus, the display record of each of advertisements that have been actually displayed in the store, and
    the selected terminal apparatus is a cash handling apparatus including a display unit that displays information on cash handling when the cash handling apparatus performs the cash handling, wherein
    the distribution condition includes a plurality of distribution conditions,
    the plurality of distribution conditions include a time period, temperature and humidity, and
    the cash handling apparatus includes
        at least one of a temperature sensor and a humidity sensor, and
        the advertisement to be displayed on the selected terminal apparatus is based on at least one of a temperature measured by the temperature sensor and a humidity measured by the humidity sensor.

2. The advertisement distribution system according to claim 1, wherein
    the cash handling apparatus displays the advertisement at a timing when the advertisement can be displayed on the display unit, and outputs the information on the display record of the advertisement.

3. The advertisement distribution system according to claim 2, wherein the cash handling apparatus is a change handling machine that dispenses change when a transaction with a customer is performed in the store.

4. The advertisement distribution system according to claim 2, wherein the cash handling apparatus is an ATM.

5. The advertisement distribution system according to claim 1, wherein
    the selected terminal apparatus outputs, as the display record, the number of times that each advertisement has been actually displayed on the selected terminal apparatus, and
    the management server calculates an advertisement fee to be paid to the store, based on the number of times of display of the respective advertisements displayed in the store.

6. The advertisement distribution system according to claim 1, wherein
    the selected terminal apparatus outputs, as the display record, a display time of each advertisement that has been actually displayed on the selected terminal apparatus, and
    the management server calculates an advertisement fee to be paid to the store, based on the display time of the respective advertisements displayed in the store.

7. The advertisement distribution system according to claim 1,
    wherein the store server selects the advertisement to be distributed to the selected terminal apparatus based on information on the selected terminal apparatus.

8. The advertisement distribution system according to claim 1, wherein
    the store server requests the management server to provide an advertisement to be distributed to the selected terminal apparatus while designating the type of the advertisement, and
    the management server acquires an advertisement that satisfies the request, from an advertisement providing server that provides various types of advertisements.

9. The advertisement distribution system according to claim 8, wherein
    the advertisement providing server invites bids from advertisers of advertisements that satisfy the request, and
    the advertisement that the management server acquires from the advertisement providing server is an advertisement of an advertiser that is a successful bidder.

10. The advertisement distribution system according to claim 1, wherein the management server is a cloud server.

* * * * *